(12) United States Patent
Verol et al.

(10) Patent No.: US 8,280,897 B2
(45) Date of Patent: Oct. 2, 2012

(54) METHODS AND SYSTEMS FOR ASSESSING PROJECT MANAGEMENT OFFICES

(75) Inventors: Marcus V. A. Verol, Rio de Janeiro (BR); Guilherme B. Rocha, Belo Horizonte (BR); Andre L. Rocha, Rio de Janeiro (BR)

(73) Assignee: Accenture Global Services Limited, Dublin (IE)

( * ) Notice: Subject to any disclaimer, the term of this patent is extended or adjusted under 35 U.S.C. 154(b) by 275 days.

(21) Appl. No.: 12/363,419

(22) Filed: Jan. 30, 2009

(65) Prior Publication Data
US 2010/0198847 A1     Aug. 5, 2010

(51) Int. Cl.
*G06F 7/00*     (2006.01)
(52) U.S. Cl. ....................................... 707/758
(58) Field of Classification Search ........... 707/999.102, 707/758
See application file for complete search history.

(56) References Cited

U.S. PATENT DOCUMENTS

| 2003/0050814 A1* | 3/2003 | Stoneking et al. ............... 705/7 |
| 2004/0260588 A1* | 12/2004 | Bowen ............................. 705/7 |
| 2005/0071737 A1* | 3/2005 | Adendorff et al. ............ 715/500 |

OTHER PUBLICATIONS

Hobbs, Brian, The Multi-Project PMO: A Global Analysis of the Current State of Practice, a White Paper Prepared for Project Management Institute, Jun. 2007, Project Management Institute (44 pgs.).
Thomas, Janice L. and Mullaly, Mark E., Researching the Value of Project Management, PMI Research Conference, Warsaw Poland, Jul. 2008, Project Management Institute (28 pgs.).

* cited by examiner

*Primary Examiner* — Jensen Hu
(74) *Attorney, Agent, or Firm* — Finnegan, Henderson, Farabow, Garrett & Dunner LLP

(57) ABSTRACT

Systems and methods consistent with the present invention assess and evaluate project management offices ("PMOs"). Information relating to the current project management capabilities of a PMO is obtained. The information is compared with industry best practices information and consolidated knowledge and experience. Based on the comparison, the maturities of the PMO's current capabilities are evaluated. The maturities of the PMO's current capabilities are given scores which provide a standardized measure of the maturity of each capability. In addition to the scores, recommendations are provided indicating specific ways in which the PMO may improve the maturities of its capabilities.

20 Claims, 14 Drawing Sheets

700

3. Results by Control Area Process

| CONTROL AREA PROCESS: | 2.1 – DEFINE PROJECT'S TASKS |
|---|---|

DESCRIPTION — Show Details

Process for identifying the specific activities necessary to meet project's objectives

| PROCESS ASSESSMENT SCORE: | 2.0 |
|---|---|

| PROCESS TARGET SCORE: | 3.0 |
|---|---|

COMMENTS: — Hide Details

LEVELS OF MATURITY:

LoM 1 (BASIC) — A formalized list of the activities needed to execute the project successfully is missing and it is impossible to detail exactly what has to be done to execute the project ~ 703

LoM 3 (CONSISTENT) — There is a documented list of the activities needed to execute the project, however some of them are not detailed enough to monitoring on the execution phase ~ 702

LoM 1 (BASIC) — The work that is planned and has to be performed is documented with the associated activities fully identified for each project's phase. Activities are decomposed at most suitable level of detail that allows efficient monitoring of work progress ~ 701A, 701B

*FIG. 7*

| 1 - Risks | 3 - Communication | 4 - Scope | 9 - Quality |
|---|---|---|---|
| The process of identification of new risks is continuously performed during scheduled meeting throughout the project. Response plan execution is constantly monitored with the help of a customized tool. Risks owners report periodically to project manager on the effectiveness of the plan, any unanticipated effects, and any mid-course correction needed to handle the risk properly. | Every stakeholder is identified and their expectations and needs are documented as well as power of influencing project's execution. | Scope control is concerned not only with the current change requests but also with the influencing factors that create project scope changes. All requested changes and recommended corrective actions are processed following standardized procedures supported by efficient tools. | Inside the project team or even outside the project there is a quality assurance area that oversees project's activities and guarantees that all needed processes to meet the requirements are being implemented as planned. This area also performs continuous processes improvements which provides iterative means for improving the quality of all processes. |
| Risks identification activities are constantly performed during risks workshops with the presence of members of different project areas and subject matter experts from outside the project. Lessons learned from similar projects are used as reference guide to help risks identification and categorization. | The communication plan is developed and documented containing for whom the information will be distributed, when, how and by whom. The source of all information is already known and the distribution layout is already designed. | The project scope is defined and described with great specificity. Project requirements reflect stakeholders needs and expectations. Assumptions and constraints are also collected and documented in an unique file which is available to the entire project team. The project work is decomposed into smaller parts allowing better scope control | Project's results are constantly monitored through inspections and matched against the defined goals. KPIs are extensively used and provide insights into the project progress and quality. Advanced analysis techniques are put in place such as histograms, statistical sampling and scatter diagrams. |

METHODS AND SYSTEMS FOR ASSESSING PROJECT MANAGEMENT OFFICES

FIELD OF THE INVENTION

Methods and systems consistent with embodiments of the present invention relate to assessing and evaluating Project Management Offices of organizations, and providing recommendations for making improvements thereto.

BACKGROUND

Project Management Offices ("PMOs") exist in numerous forms, and are given different names, within organizations. While the name Project Management Office is most commonly used to refer to PMOs, other names include Project Office, Project Department, Project Support Office, Program Management Office, and Center of Excellence. Other organizations give PMOs no name at all.

A PMO is an entity within or parallel to an organization that has responsibilities related to the design, implementation, or review of a project undertaken by the organization. Responsibilities of a typical PMO include initiating and staffing a project, assessing progress made on the project, making decisions relating to the implementation of the project, providing project updates to other entities within or outside the organization, and coordinating or integrating one project with other projects, among many other responsibilities. In some PMOs, only a single project is managed. In other PMOs, multiple projects—perhaps even all of an organization's projects—are managed simultaneously. PMOs also differ in whether they include project managers, as opposed to only non-manager workers.

PMOs exist in a wide variety of organizational settings. From for-profit businesses, to non-profit organizations, to governmental agencies, PMOs are establishing a growing presence in today's world. While the specific responsibilities of PMOs in different organizational settings often differ, the basic functionality of PMOs is similar in most settings. At their core, PMOs exist to manage projects being undertaken by the organization with which they are associated.

Despite recent growth in the number of PMOs being used by organizations, however, recent studies show that the value, and even the existence, of PMOs are being challenged within organizations. Organizations are asking themselves whether PMOs are worth their cost. Specifically, a typical PMO employs several employees, each of whom must be paid a salary, provided office space, given employment benefits, supported by other staff workers, etc. In addition, transaction costs and opportunity costs arise whenever a PMO interfaces with other employees and entities within an organization, because the other employees and entities are temporarily taken away from other work while interfacing with the PMO. Further, setting up a new PMO within an organization can take several months, or even years.

While the effectiveness of PMOs is being criticized, the need for effective project management is increasing. Projects are becoming ever-more complex, integrated, and resource-intensive. Disconcertingly, a recent study found that 39% of project with budgets over $10 million fail. As projects continue to grow in scope and budget, failure rates can be expected to climb further. As failure rates increase, the cost associated with PMOs will increase correspondingly, and the criticism of PMOs can be expected to mount, unless substantial improvements are made to project management.

Several recommendations for improving PMOs have been offered by commentators and industry participants, but none promise to provide the significant, targeted benefits that project management needs. For example, it has been suggested that PMOs, in general, should receive increased discretion, additional personnel, more funding, and better standing within organizations. Other recommendations have included hiring project managers from a wider variety of cultural backgrounds and providing enhanced training for project managers. None of these recommendations, however, provide concrete, repeatable, useful methods of improving PMOs.

SUMMARY OF THE INVENTION

In order to effectively improve project management offices ("PMOs"), embodiments consistent with the present invention provide ways to analyze PMOs that take into account each PMO's unique situation, draw on extensive benchmark information and accumulated knowledge and experience, and produce useful and standardized evaluations and recommendations.

Currently, PMO assessments are performed without the benefit of fully integrated knowledge and experience gained from other PMO assessments and other applicable experience. As a result, obtaining and applying knowledge and experience to a given PMO is often an inefficient and error-prone process. PMO assessments also lack standardization, because the knowledge and experience on which they are based is not consolidated and organized for use in the assessment. Further, the process of PMO assessment, and the form of results provided, often lack standardization. Consequently, PMO assessments suffer from relativism and ambiguity, and organizations have trouble determining how their PMO compares to those of their peers.

Accordingly, it is desirable to provide tools and methods for the assessment and improvement of PMOs that will overcome the drawbacks of the existing situation. In some embodiments consistent with the invention, information relating to a PMO's current capabilities, the maturities of its capabilities, and its other aspects may be obtained. The information obtained may be compared with benchmark and best practices information and with a consolidated grouping of knowledge and experience applicable to the PMO. The capabilities, maturities, and other aspects of the PMO may then be evaluated based on the benchmarks and knowledge and experience.

Based on the evaluation of the PMO's capabilities, maturities, and other aspects, one or more scores may be given to the PMO in various categories. In various embodiments, the scores may be either quantitative or qualitative. The scores represent the assessment of the PMO based on the benchmarks and the consolidated knowledge and experience. In addition to the scores given, target scores may be provided, which represent levels of capabilities, maturities, and other aspects of the PMO that the PMO should strive to attain. In some embodiments, the scores are provided by means of graphical representation. Thus, various embodiments of the present invention make PMO assessments easier to understand and act upon, by presenting helpful graphical representations of differences between a PMO's current capabilities and applicable benchmarks for the capabilities.

Recommendations may be provided to the PMO concerning ways in which it can improve its capabilities, maturities, and its other aspects that were evaluated. In some embodiments, the recommendations may be provided to the PMO together with the graphical representations of the scores.

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

BRIEF DESCRIPTION OF THE DRAWINGS

FIG. 7 is an exemplary depiction of a user interface to a tool for assessing PMOs, including a non-exhaustive listing of pre-defined levels of maturity for a PMO's current capabilities, and fields for selecting pre-defined levels of maturity, consistent with principles of the present invention.

FIG. 8 is an exemplary depiction of a user interface to a tool for assessing PMOs, including fields in which information relating to industry best practices and/or maturity information may be entered, consistent with principles of the present invention.

DESCRIPTION OF THE EMBODIMENTS

Reference will now be made in detail to the exemplary embodiments of the invention, examples of which are illustrated in the accompanying drawings. Wherever convenient, the same reference numbers will be used throughout the drawings to refer to the same or like parts.

Figure 1:
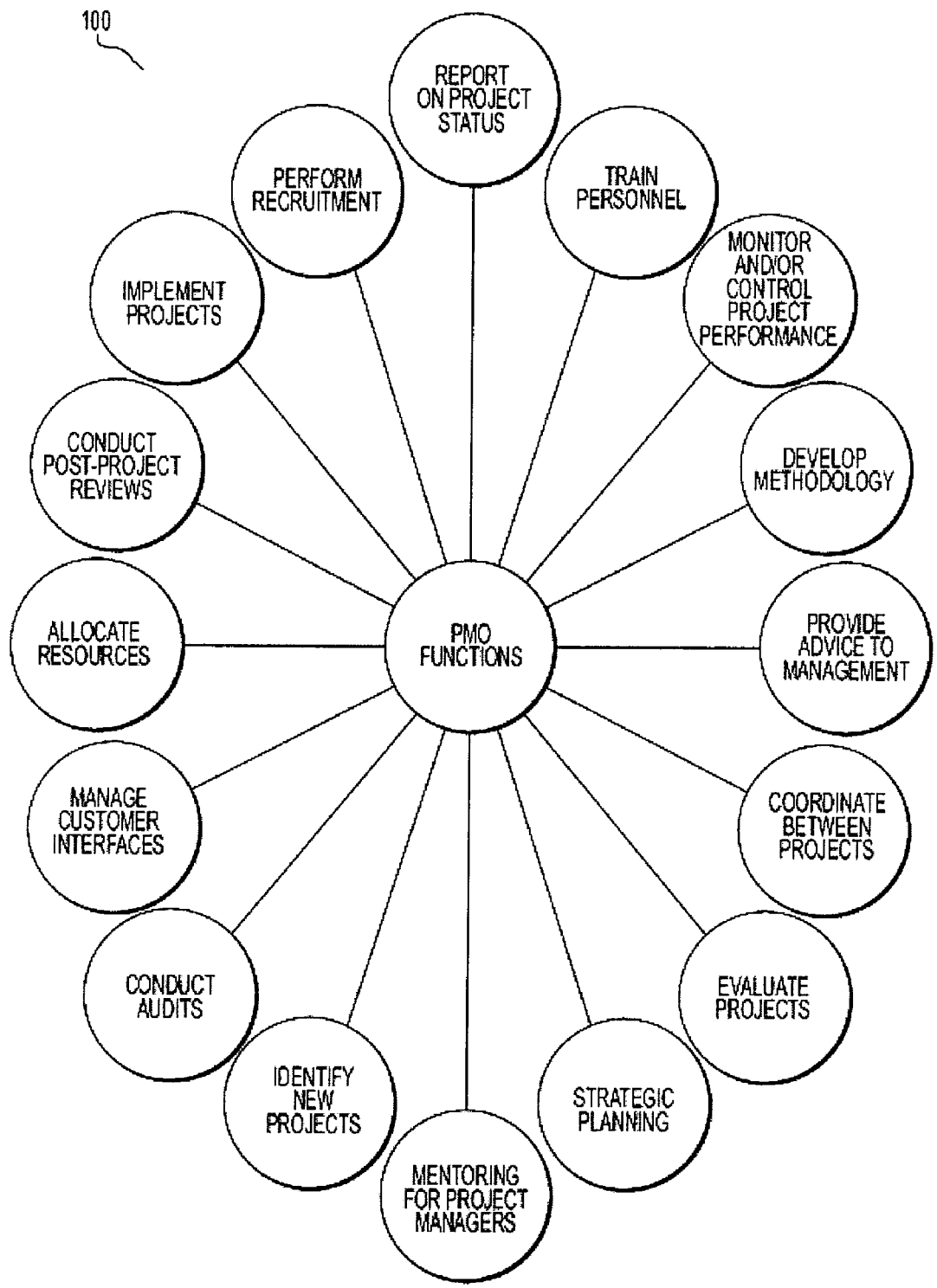
FIG. 1 is a diagram showing non-exhaustive, exemplary functions that a PMO may perform, consistent with principles of the present invention.

FIG. 1 represents exemplary functions 100 that a PMO may perform, consistent with principles of the present invention. While many PMOs perform most of these functions 100, some PMOs perform more or less functions depending on their role and the needs of the organization with which they are associated.

Figure 2:
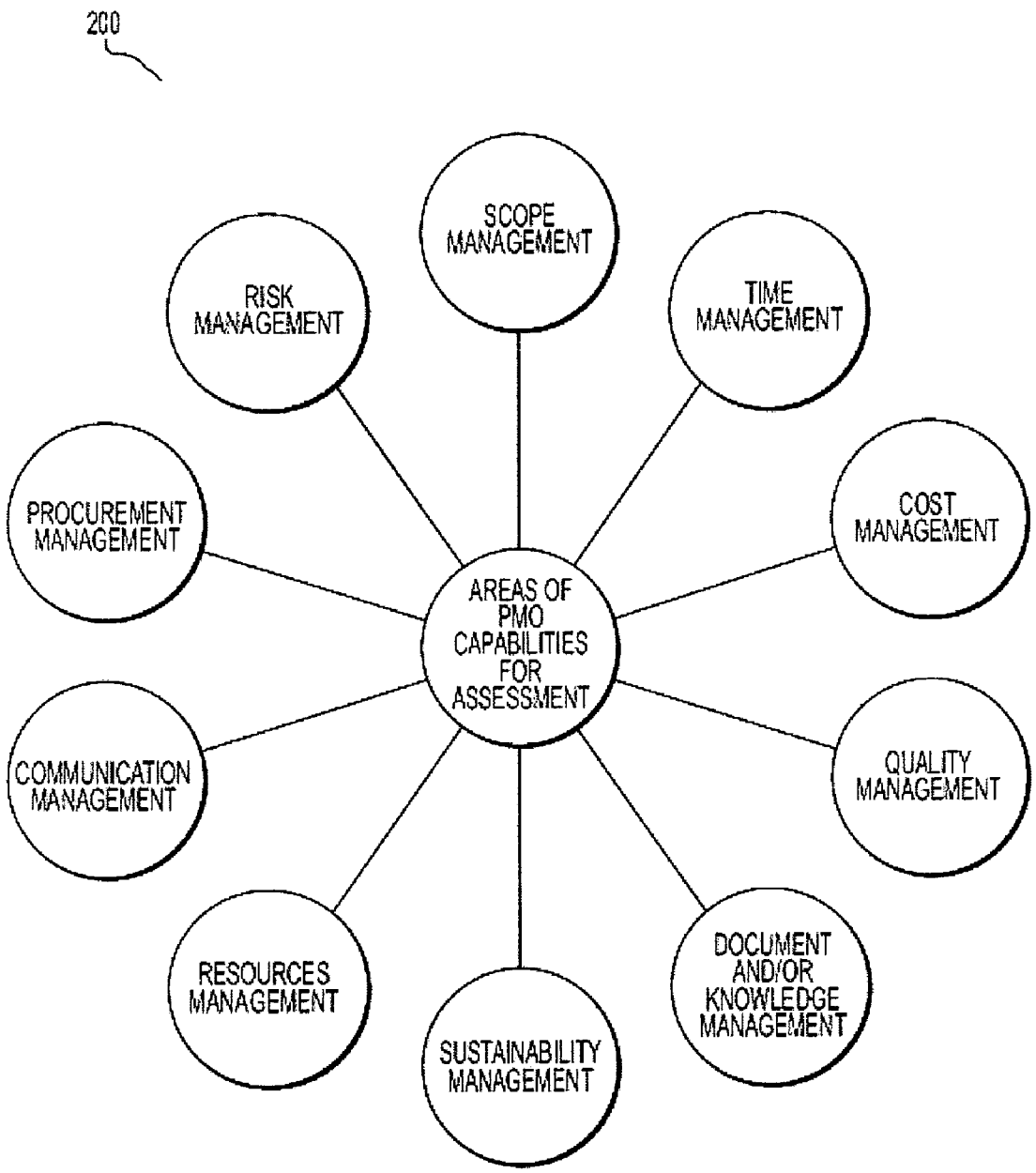
FIG. 2 is a diagram showing non-exhaustive, exemplary PMO capabilities that may be assessed, consistent with principles of the present invention.

An exemplary list of PMO capabilities 200 that may be assessed and evaluated is shown in FIG. 2. In some embodiments consistent with the invention, there are provided systems and methods for assessing and evaluating capabilities, such as capabilities 200, of PMOs. The assessment of a PMO may focus on some or all of these capabilities 200, and may also focus on additional capabilities as well.

Figure 3:
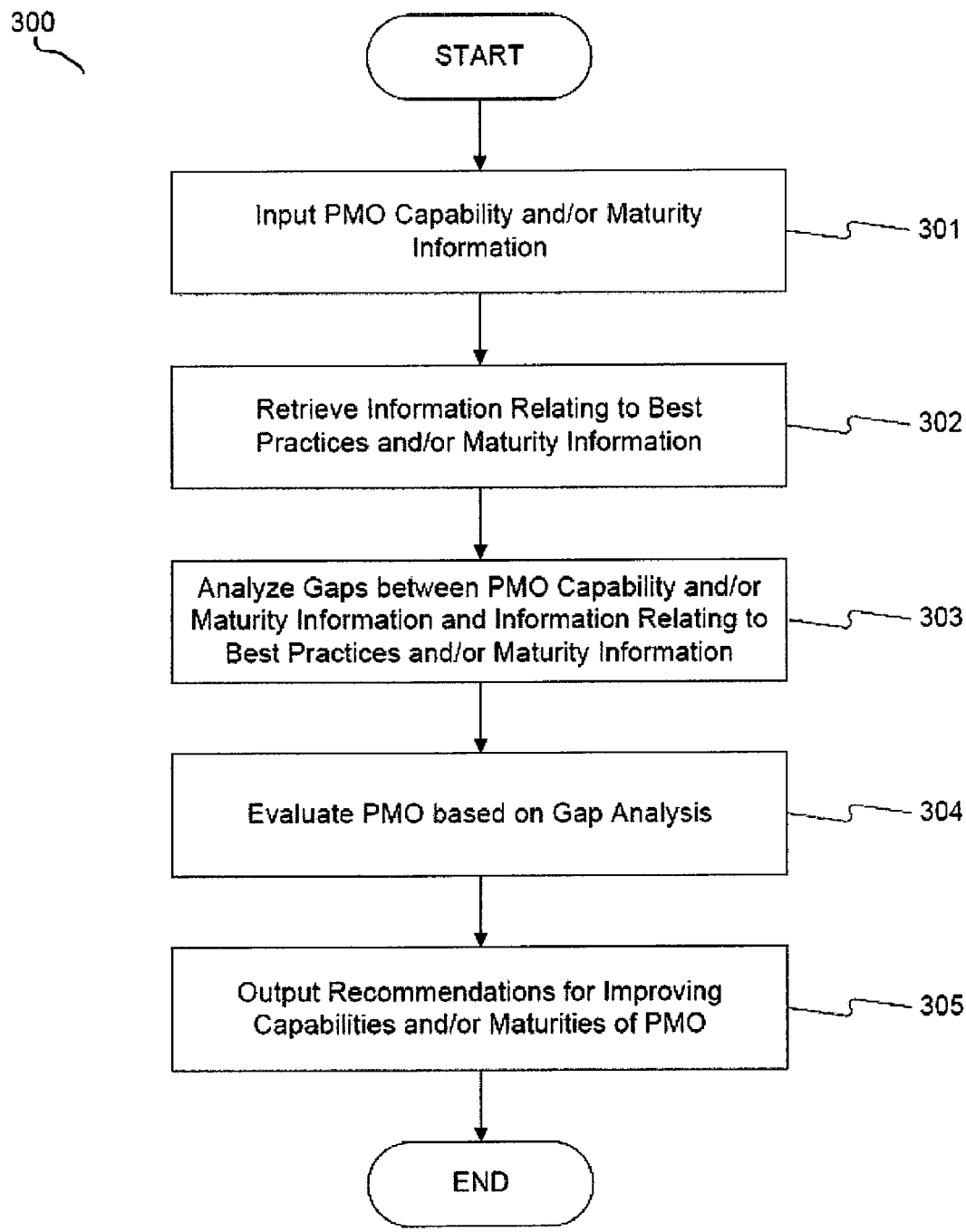
FIG. 3 is an exemplary flowchart depicting, in general terms, one exemplary embodiment of a PMO assessment process, consistent with principles of the present invention.

FIG. 3 presents an exemplary flowchart 300 generally depicting one exemplary embodiment of a PMO assessment process, consistent with principles of the present invention. In the embodiment shown, to begin the PMO assessment, information relating to the PMO's current capabilities 200 is obtained and input 301 into an appropriate place or field. Information relating to best practices and/or maturity information may then be retrieved 302. Next, a gap analysis 303 may be performed on the information relating to the PMO's current capabilities 200 and the best practices and/or maturity information. The PMO's current capabilities 200 may then be evaluated 304 based on the gap analysis 303. Lastly, recommendations may be created 305 for improvements to the PMO's current capabilities. Each aspect of the process shown in FIG. 3 is discussed further below.

Process 300 is an example of one embodiment consistent with the invention, and it may have stages added, deleted, reordered, or modified without departing from principles of the invention.

In embodiments represented by the flowchart 300 of FIG. 3, the PMO assessment begins by gathering and inputting 301 information relating to the PMO's capabilities 200. This information may be obtainable in several ways. One way to obtain the information is to conduct an interview with the PMO's managers or other employees. During the interview, the PMO members may provide information relating to various aspects of the PMO's current capabilities 200, such as risk management, scope management, time management, cost management, quality management, document and/or knowledge management, sustainability management, resources management, communication management, and procurement management. Depending on the nature and scope of the PMO assessment, various degrees and quantities of information relating to the PMO's current capabilities 200 may be obtained.

In other embodiments of the present invention, the PMO may obtain and input 301 the above-mentioned information about its own capabilities 200. In these embodiments, the PMO can proceed to perform an assessment of its own current capabilities 200. It may alternatively communicate the information to a third-party (e.g., a consulting firm, auditing company, joint venture partner, etc.), which may perform the assessment.

In one embodiment, some or all of the stages of the process 300 shown in FIG. 3 may be implemented using a computing system programmed with appropriate software. The software may be in the form of a tool or application that accepts input, stores data, retrieves stored data, performs calculations, implements algorithms, and produces outputs as described with respect to FIG. 3 and throughout this specification.

Figure 4:
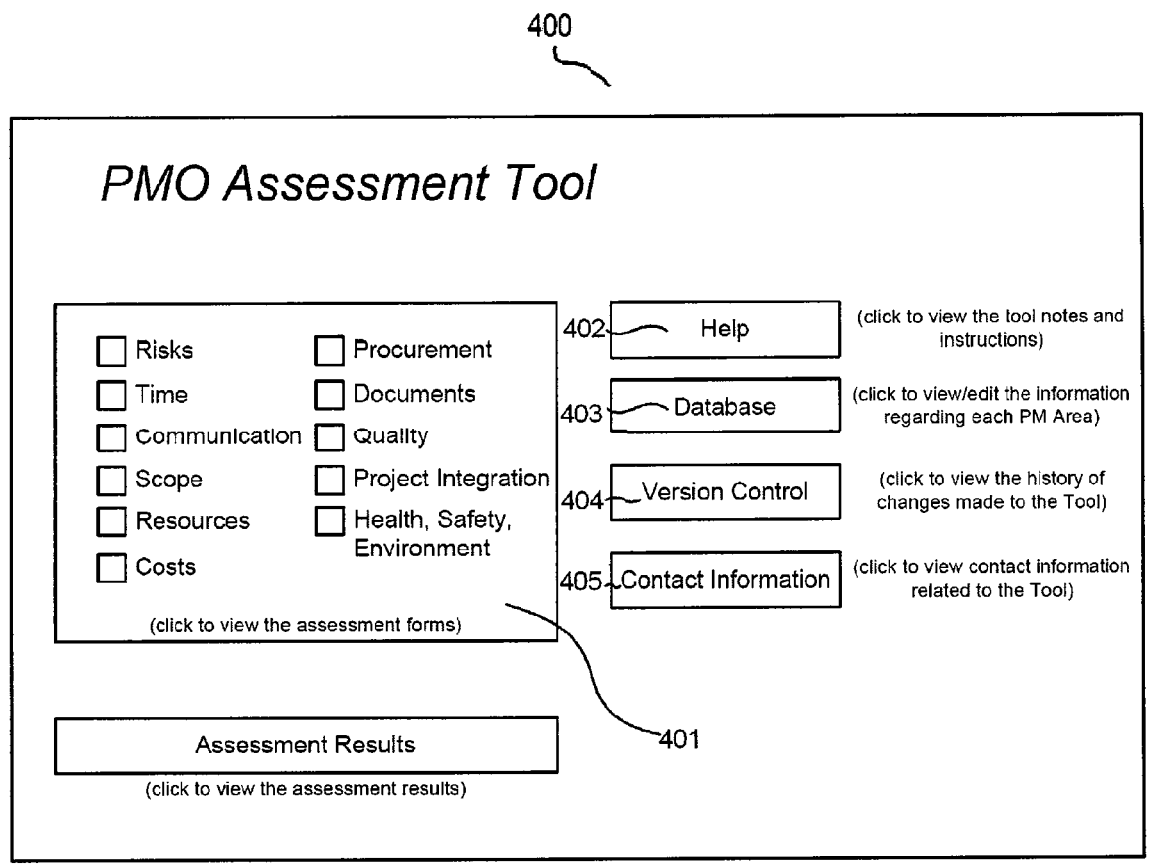
FIG. 4 is an exemplary depiction of a user interface to a tool for assessing PMOs, including a non-exhaustive listing of selectable navigation fields and fields associated with assessment forms, consistent with principles of the present invention.

FIG. 4 is an exemplary depiction of a software-implemented user interface 400 to a tool for assessing PMOs, including a non-exhaustive listing of selectable navigation fields and fields associated with assessment forms 401-405, consistent with principles of the present invention. In some embodiments, a user interface such as the one shown may be used to implement stage 301 of FIG. 3. In one embodiment, the user interface 400 may contain a list of selectable fields 401 corresponding to PMO capabilities 200 to be assessed. Other selectable fields may allow the user to access help information 402 about the PMO assessment software, databases 403 containing stored information concerning project management, different versions of the user interface 404, and contact information 405 for the developers or providers of the assessment tool. Alternatively, in some embodiments the information relating to the PMO's capabilities 200 may be obtained and retained manually by the user.

In one embodiment, selecting one of the fields 401 corresponding to PMO capabilities 200 to be assessed may present the user with one or more fields in which information relating to the PMO's capabilities 200 may be input. For instance, referring to the exemplary user interface 400 shown in FIG. 4, a user may select the selectable field 401 for time management. The user would then be presented with one or more fields for time management information. In this example, the user could enter information about the PMO's current capabilities 200 in the area of time management in the fields provided.

Figure 5:
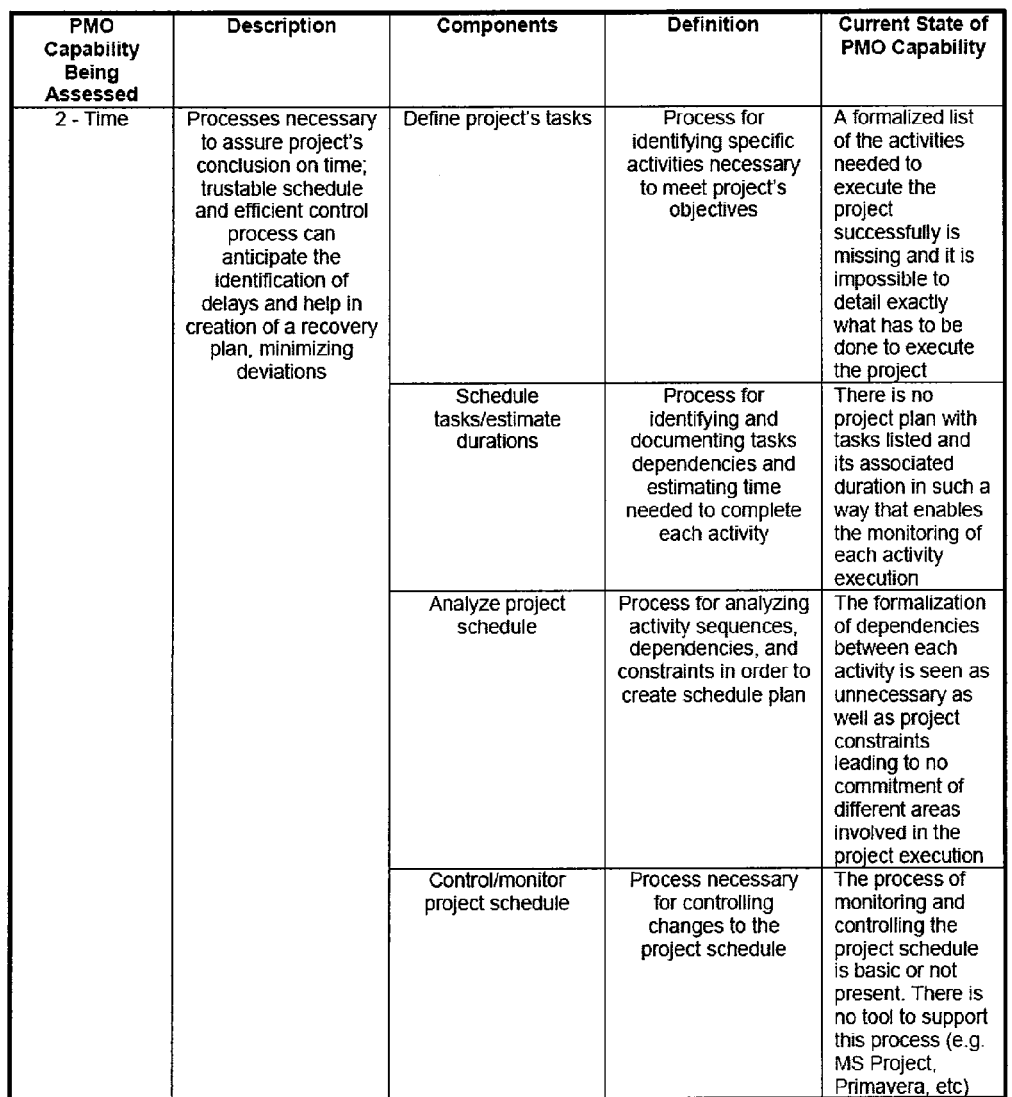
FIG. 5 is an exemplary depiction of a user interface to a tool for assessing PMOs, including a non-exhaustive group of pre-defined fields for information relating to the PMO capability being assessed, consistent with principles of the present invention.

FIG. 5 is an exemplary depiction of an organization scheme for a user interface 500 to a tool for assessing PMOs, including a non-exhaustive group of pre-defined fields for information relating to the PMO capability 200 being assessed, consistent with principles of the present invention. For example, as shown in FIG. 5, the PMO capability 200 of time management may be assessed. In such an example, the user interface 500 may be organized to provide fields representing the name 501 of the PMO capability 200 being assessed (time management), and a description 502 thereof. The user interface 500 may also present information concerning the various components 503 of the capability 200 of time management, such as defining a project's tasks, scheduling tasks and/or estimating task durations, analyzing project schedules, and controlling and/or monitoring project schedules. For reference, a definition 504 of various components of the PMO capability 200 being assessed 501 may also be provided. In addition, the user interface 500 may provide a field in which the user may input information relating to the PMO's current capabilities 505. In one embodiment, the user may enter this information into the field 505, for example, by typing on a computer keyboard, speaking while using voice-recognition software, or comparable means. In an alternative embodiment, the user may select pre-defined information for the field 505 by selecting from a list of choices of pre-defined information relating to the PMO capability 200 being assessed. In further embodiments, the fields 501-505 are customizable by the user to contain pre-formatted fields specifically tailored for a particular PMO assessment. In some embodiments, a user interface such as the one shown may be used to implement stage 301 of FIG. 3.

In a further alternative embodiment, the fields 501-505 may contain pre-formatted sub-fields associated with more specific information related to a PMO's capabilities 200. For example, in the embodiment described above, if the PMO capability 200 of time management is being assessed, one field 505 may be pre-formatted for information indicating whether a PMO adequately controls and/or manages project schedules. In an embodiment containing sub-fields, pre-formatted sub-fields for this field 505 may be provided to indicate whether the PMO has, for example, established sufficient processes for monitoring and controlling the project schedule, and whether there are tools to support the project processes. The user may enter information into the sub-fields in a fashion similar to the entry of information into the fields described above. Further, in one embodiment, further levels of drill-down may be used, such as a sub-field of a sub-field. In the example just given, a sub-field of a field may correspond to information stating whether the PMO has tools to support the project processes. A sub-field of this sub-field may allow the user to indicate the name of any tools utilized (e.g., Microsoft® Project, Oracle® Primavera, etc.). This field structure of inputting information may contain as many layers of fields as needed for a given PMO assessment, and may be customized by the user.

Figure 6A:
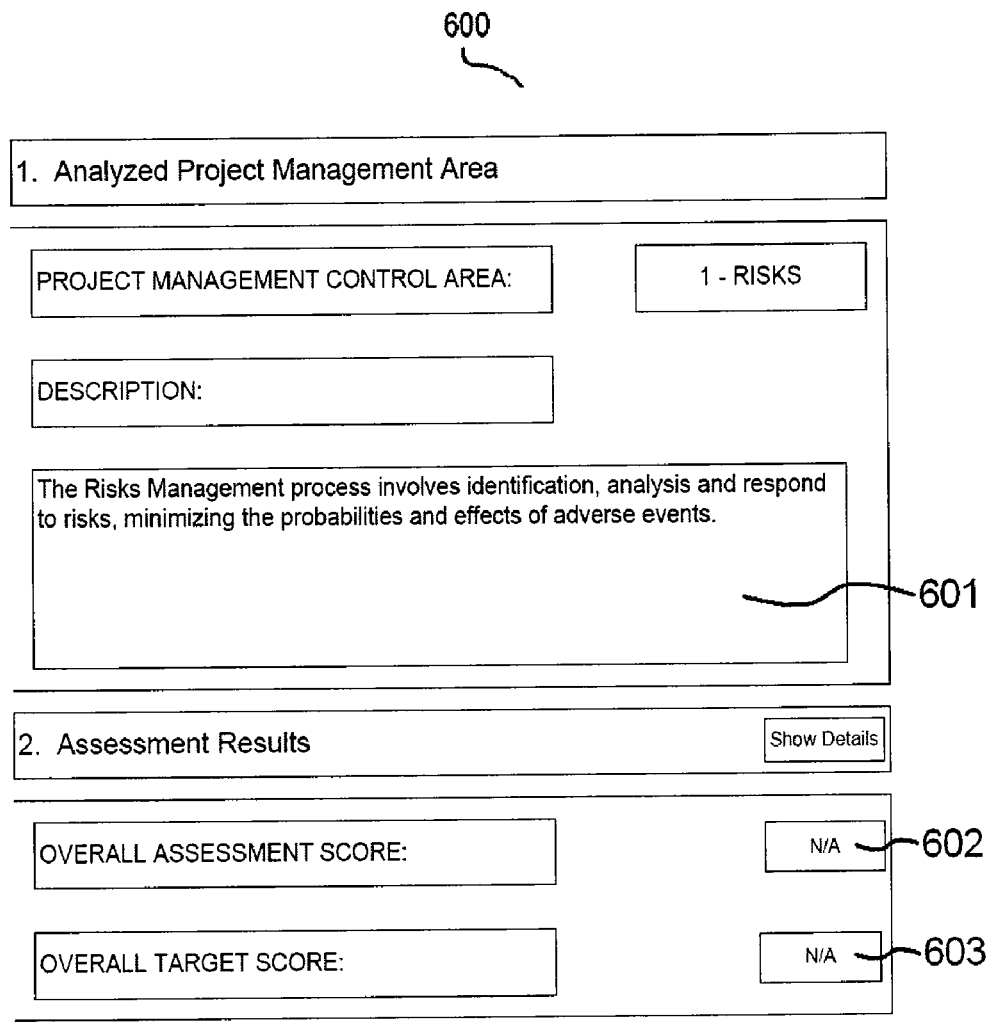
FIG. 6A is an exemplary depiction of a user interface to a tool for assessing PMOs, including an exemplary description of the PMO capability relating to risks management and selectable fields for inputting information relating to the PMO's capabilities, consistent with principles of the present invention.
Figure 6B:
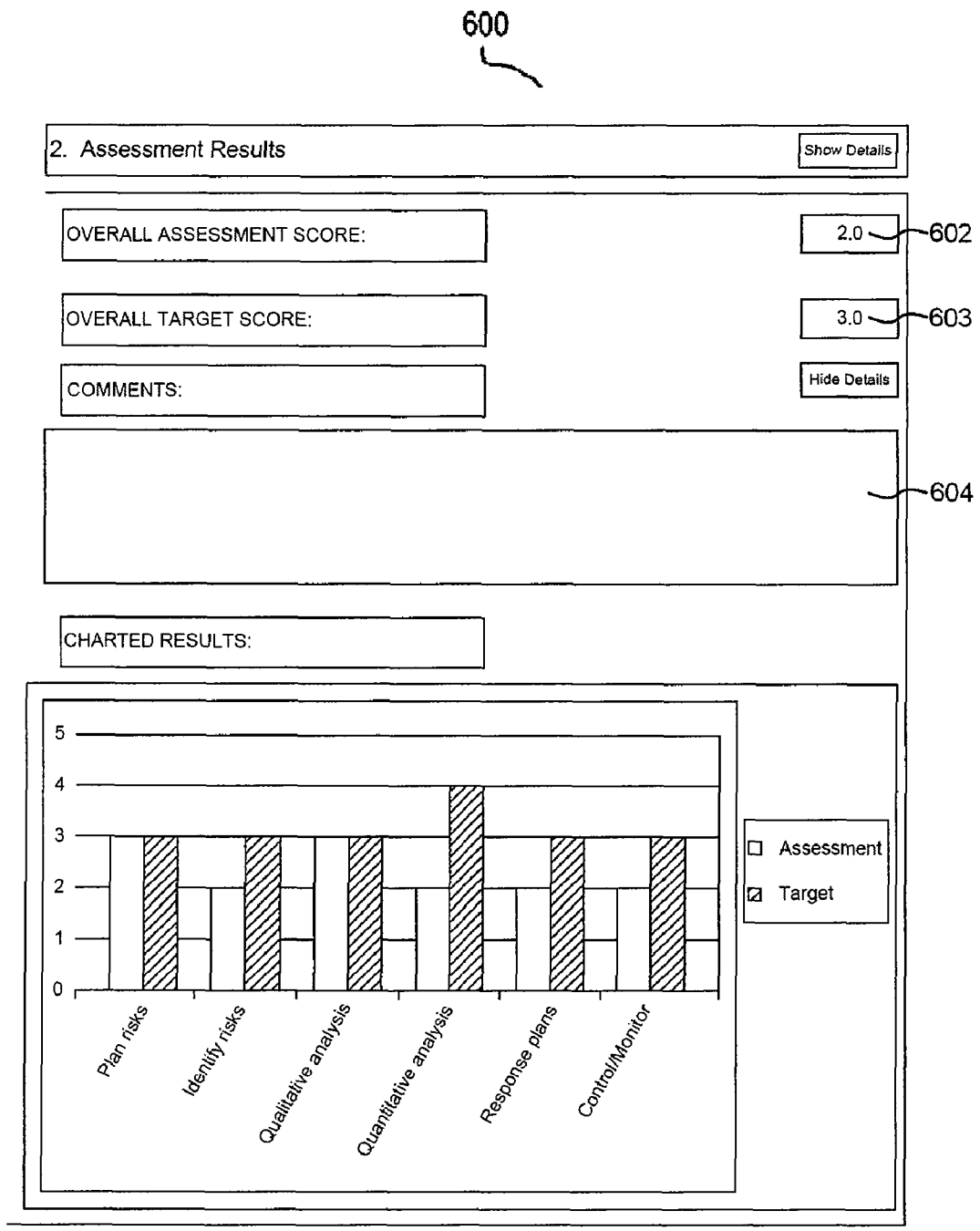
FIG. 6B is an exemplary depiction of a user interface to a tool for assessing PMOs, including a comments field and chart for depicting the maturity of the PMO's capabilities alone or in relation to target maturity levels, consistent with principles of the present invention.

FIG. 6A is an exemplary depiction of a user interface 600 to a tool for assessing PMOs, including an exemplary description 601 of the PMO capability 200 relating to risks management, consistent with principles of the present invention. In some embodiments, a user interface such as the one shown may be used to implement stage 301 of FIG. 3. In one embodiment, selectable fields are provided corresponding to assessment scores 602 for the PMO's capabilities 200 and target scores 603 representing industry best practices or desired or recommended levels of maturity to be reached for the PMO capability being assessed 200. Examples of these scores are addressed more fully below. In addition, as shown in FIG. 6B, the user interface 600 may also contain an area for the user to include comments 604 regarding the PMO's capabilities. The comments 604 may assist the user in assessing the PMO by providing additional helpful information concerning the PMO's capabilities 200. In the embodiment shown, assessment scores 602 are represented graphically in relation to target scores 603 in a charted results 605 section. Graphical representations of scores are discussed more fully below.

FIG. 7 is an exemplary depiction of a user interface to a tool for assessing PMOs, including a non-exhaustive listing of pre-defined levels of maturity for a PMO's current capabilities, and fields for selecting pre-defined levels of maturity, consistent with principles of the present invention. Once the information concerning the PMO is obtained, or in certain embodiments, before the information has been obtained, information relating to industry best practices 701A and maturity information 701B of PMOs may be obtained. In some embodiments, a user interface such as the one shown may be used to implement stage 302 of FIG. 3.

The differences between industry best practices information 701A and maturity information 701B are explained below, however, in the embodiment shown in FIG. 7, both are represented by the same exemplary field, because in this embodiment, the two forms of information are combined for purposes of performing a PMO assessment. For instance, in FIG. 7, industry best practices information 701A and maturity information 701B are combined to produce the "benchmark" information shown. In other embodiments, industry best practices 701A and maturity information 701B may be kept separate and perform separate roles in a PMO assessment.

Industry best practices information 701A (also referred to as "best practices" or "standards" information) may include guidelines, recommendations, principles, goals, or rules established by an organization, committee, or group of observers concerning one or more aspects of project management. In some cases, industry best practices information 701A is published in print or electronically. Less commonly, industry best practices information 701A is generated by a single organization or a limited group of organizations and withheld from the general public. Examples of industry best practices information 701A include the various Standards and other publications of the Project Management Institute, available at http://www.pmi.org. The intent of many providers of industry best practices information 701A is to provide a basis for improving or standardizing business processes across industries. The providers often desire that industry participants emulate the best practices information 701A and thereby improve their performance.

FIG. 8 is an exemplary depiction of an organization scheme for a user interface 800 to a tool for assessing PMOs, including fields in which information relating to industry best practices 701A and maturity 701B information may be entered, consistent with principles of the present invention. Industry best practices information 701A may be stored in a fashion similar to that for information relating to a PMO capability 200, as described above. Once industry best practices information 701A is obtained, it may be stored either electronically or in non-electronic form. If stored electronically, for example in fields similar to those shown in FIG. 8, the information may be organized in terms of different capabilities 200 of project management. For instance, industry best practices information 701A relating to risks management 801 can be stored within one organizational category, and industry best practices management information 701A relating to scope management 803 can be stored within another organizational category. The same may be done for communications management information 802, quality management information 804, and numerous other areas of the PMO's capabilities 200. Various forms of data storage and access software can be used to store and access the industry best practices information 701A, as discussed in further detail below. The fields described in various embodiments of the invention may correspond to locations in a database, or may correspond to higher level software commands that in turn update or otherwise alter a database. In one embodiment, the information may be arranged so that industry best practices information 701A is associated with corresponding information relating to the capabilities 200 of the PMO being assessed. In one embodiment, for example, where the information relating to capabilities 200 of the PMO includes pre-formatted fields and sub-fields, the industry best practices information 701A may include similar fields and sub-fields, thus facilitating comparison between the information relating to capabilities 200 of the PMO and the industry best practices information 701A.

The industry best practices information 701A may be updated regularly to reflect changes, if any, in the information. For example, if a provider of best practices information 701A amended several of its best practices guidelines, the amended guidelines may be obtained by the user and used in place of the prior guidelines. If the industry best practices information 701A is stored electronically, updates may be made to the fields described above to reflect the changes in the guidelines.

Maturity information 701B relating to PMOs (also referred to as consolidated "knowledge" or "experience") includes the information, knowledge, experience, lessons learned, insights, and tips that users have acquired from current and prior PMO assessments and related activities. This information concerns individual project management capabilities or combinations of different capabilities. For example, the maturity information 701B may relate solely to communication management, or it may relate to the interrelationships between procurement management, quality management, and cost management. In some embodiments, maturity information 701B is obtained corresponding to the capabilities 200 of a PMO to be assessed.

As with industry best practices information 701A, maturity information 701B may be stored electronically or non-electronically. The same forms of information categorization and the same methods of data storage and access may also be used for maturity information 701B. The industry best practices information 701A may be stored in fields separate from the fields containing maturity information 701B, or the two forms of information may be stored together in the same field(s). Additionally, maturity information 701B may be updated in a process similar to that of industry best practices information 701A. One way in which maturity information 701B may be updated is for individual or institutional users to update the fields containing the maturity information 701B when they have new information to add. For example, if an user completes a PMO assessment, and has in the process acquired knowledge or experience relating to the maturity of PMO capabilities 200 that may be useful for future PMO assessments, the user may update the fields to reflect that knowledge or experience. Likewise, if the user acquires knowledge or experience through other means, such as attending a conference, conducting research, consulting with others in the same or related professions, or reading literature related to project management, the user may update the fields to reflect that knowledge or experience.

In some embodiments, the industry best practices information 701A may be merged with the maturity information 701B. For example, a user may obtain industry best practices information 701A for one or more capabilities 200 of PMOs. The user may also have acquired maturity information 701B through means such as attending a conference, conducting research, consulting with others in the same or related professions, or reading literature related to project management, that may supplement the industry best practices information 701A. In such a case, the user may augment or otherwise modify the information it has relating to industry best practices 701A to reflect the acquired knowledge and experience. In an embodiment in which the industry best practices information 701A and maturity information 701B are stored in fields, this may be accomplished by updating the fields. Preferably, the fields are updated in this way regularly to contain the most accurate and helpful information for future PMO assessments.

Figure 9:
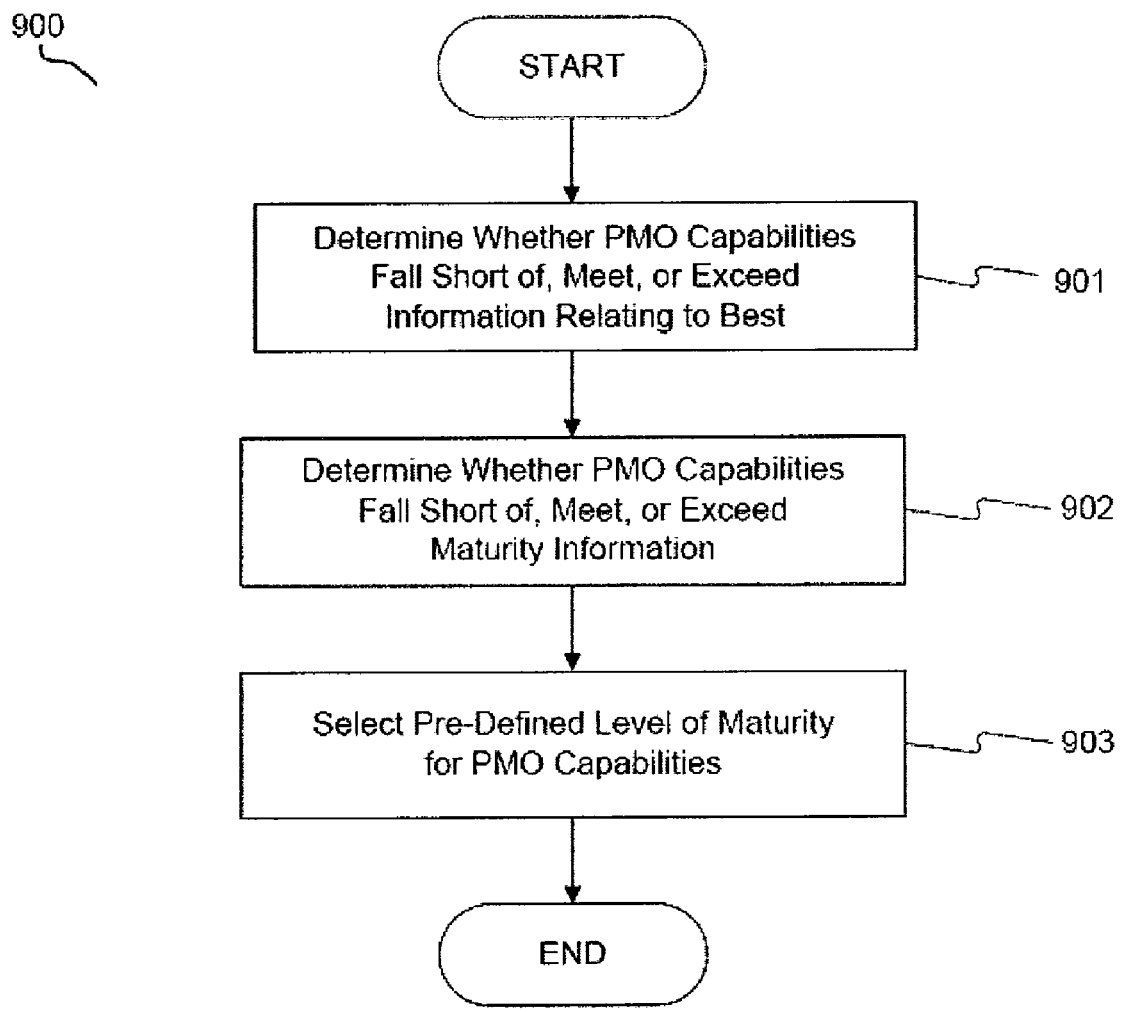
FIG. 9 is an exemplary flowchart depicting, in general terms, one exemplary embodiment of a process of gap analysis, consistent with principles of the present invention.

FIG. 9 provides an exemplary flowchart depicting, in general terms, a process of gap analysis, consistent with principles of the invention. In one embodiment, process 900 is used to implement stage 303 of FIG. 3. Gap analysis, sometimes referred to as "benchmark analysis," "benchmarking," "comparison," "taking a differential," or "assessment," etc., begins, in the embodiment shown, by determining 901 whether a PMO's capabilities fall short of, meet, or exceed information relating to best practices 701A. Alternatively or in addition, it is determined 902 whether the maturity of the PMO's capabilities fall short of, meet, or exceed maturity information 701B. In one embodiment of gap analysis, a pre-defined level of maturity is then selected 903 to represent the maturity of the PMO under evaluation, based on the determinations 901-902 made.

In an embodiment in which pre-defined levels of maturity are used, the selection of the pre-defined levels of maturity may be performed manually by the user, or may be performed automatically based on the information concerning the PMO's capabilities that the user has entered. An exemplary pre-defined level of maturity for a low (or "basic") level of maturity 703 in a PMO is shown in FIG. 7. Additionally, FIG. 7 provides an exemplary pre-defined level of maturity for a medium ("consistent") level of maturity 702, and for a high ("benchmark") level of maturity 701A, 701B. In alternative embodiments, there may be many intermediate pre-defined levels of maturity between the pre-defined levels of maturity illustrated in FIG. 7.

In the embodiment illustrated in FIGS. 6A and 6B, a gap analysis of a PMO's risks management capabilities is being performed. The analysis involves determining whether the PMO's risks management capabilities fall short of, meet, or exceed the applicable industry best practices information 701A and maturity information 701B for risks management. In one embodiment, the appropriate pre-defined level of maturity for risks management may be automatically selected based on risks management information inputted by the user.

For example, in an embodiment containing fields and sub-fields in which risks management information may be entered, the information input into the fields and subfields may correspond to a pre-defined level of maturity, and that pre-defined level of maturity may be automatically selected. The correspondence may be determined in several ways. For example, in an embodiment where the user inputs information relating to the PMO's risks management capabilities by selecting pre-defined levels of maturity, there may be a finite number of fields and sub-fields, and hence a finite number of combinations of information relating to the PMO's risks management capabilities. Each combination could be associated, via programming commands, with an appropriate pre-defined level of maturity for risks management. In another embodiment, each pre-defined level of maturity could be represented by a range of quantitative scores. Likewise, each field and sub-field containing information relating to the PMO's risks management capabilities could be given a simple or a weighted score. The user's selection of fields and sub-fields may be represented quantitatively by the scores associated with each field and sub-field. The resulting aggregated scores would then fall within one of the ranges of scores for pre-defined levels of maturity of risks management. In this way, the user's selection of fields and sub-fields representing information about risks management capabilities could automatically produce a pre-defined level of maturity for the PMO's risks management capabilities.

In an alternative embodiment, the user may manually select the appropriate pre-defined level of maturity for the PMO's risks management capabilities. For example, if the user concludes, based on the user's comparison of the PMO's risks management capabilities with risks management best practices and the user's knowledge and experience, that the PMO's risks management capabilities correspond to a certain pre-defined level of maturity, the user may select that pre-defined level of maturity.

Figure 10:
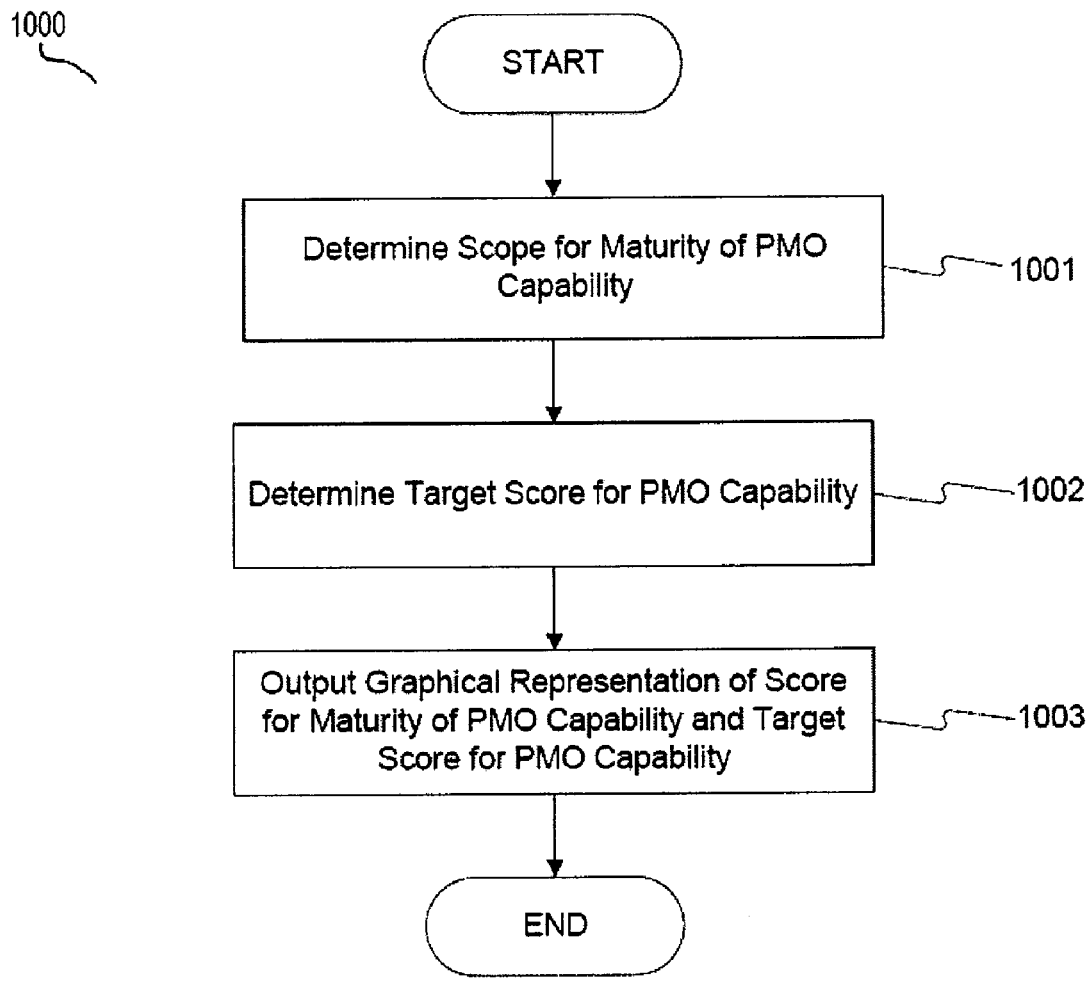
FIG. 10 is an exemplary flowchart depicting, in general terms, one exemplary embodiment of a process for producing an evaluation of a PMO's capabilities, consistent with principles of the present invention.

FIG. 10 is an exemplary flowchart 1000 depicting, in general terms, one exemplary embodiment of a process for producing an evaluation of a PMO's capabilities, consistent with principles of the present invention. In one embodiment, process 1000 is used to implement stage 304 of FIG. 3. In the embodiment shown, a score for the maturity of the PMO's capabilities may be determined 1001. In addition, a target score for the PMO's capabilities may be determined 1002. Based on these scores 1001-1002, a graphical representation of the scores may be produced 1003. Numerous means of producing the quantitative scores and the graphical representations thereof may be utilized, as discussed below.

Figure 11:
FIG. 11 is an exemplary depiction of a user interface to a tool for assessing PMOs, including quantitative scores produced during a PMO assessment, consistent with principles of the present invention.

FIG. 11 is an exemplary depiction of a user interface 1100 to a tool for assessing PMOs, including quantitative scores 1101-1104 produced during a PMO assessment, consistent with principles of the present invention. In some embodiments, as shown in FIG. 11, the assessment includes producing a quantitative and/or qualitative score, and/or recommendations for improvements to the PMO. An example of a qualitative score is written assessments of the capabilities 200 of project management that were assessed. An example of a quantitative score is a numerical score for the capabilities 200 of project management that were assessed. In an embodiment using quantitative scores, the system may provide numerical scores 1102 representing levels of maturity of project management capabilities 200 corresponding to full compliance with industry best practices information 701A and maturity information 701B (called "target" or "best practice" scores), and numerical scores representing the current levels of maturity attained by the PMO 1101. Alternatively, or in addition, numerical scores can be provided corresponding to the difference between the former scores 1102 and the latter scores 1101. In some embodiments, ranges of numerical scores 1101 may be provided for each of the capabilities 200 of project management that were assessed. A score within the range may be selected based on the gap analysis. In some embodiments, the numerical scores for the PMO's current capabilities 1101 are derived by selecting pre-formatted categories describing PMO capabilities 200. For example, the user may select a pre-formatted category corresponding to the PMO's current capabilities 200. In some embodiments there may be a numerical score associated with the category selected. By this process, selecting a pre-formatted category would in turn indicate the score to be given to the PMO being assessed. In some embodiments, the score may be weighted to reflect the relative significance of the capability 200. In other embodiments, several categories, and/or sub-categories describing PMO capabilities 200 are provided. Based on the categories and/or sub-categories selected, a score 1101 is calculated based on the weight assigned to each category and/or sub-category. In some embodiments, the categories and/or sub-categories correspond to the fields and sub-fields described above. In the embodiment shown, a total score 1103 for the PMO's scores 1101 and a total score 1104 for the target scores 1102 are also presented. In one embodiment, the total scores may be calculated by averaging their constituent scores or by a method of weighted averaging.

Figure 12:
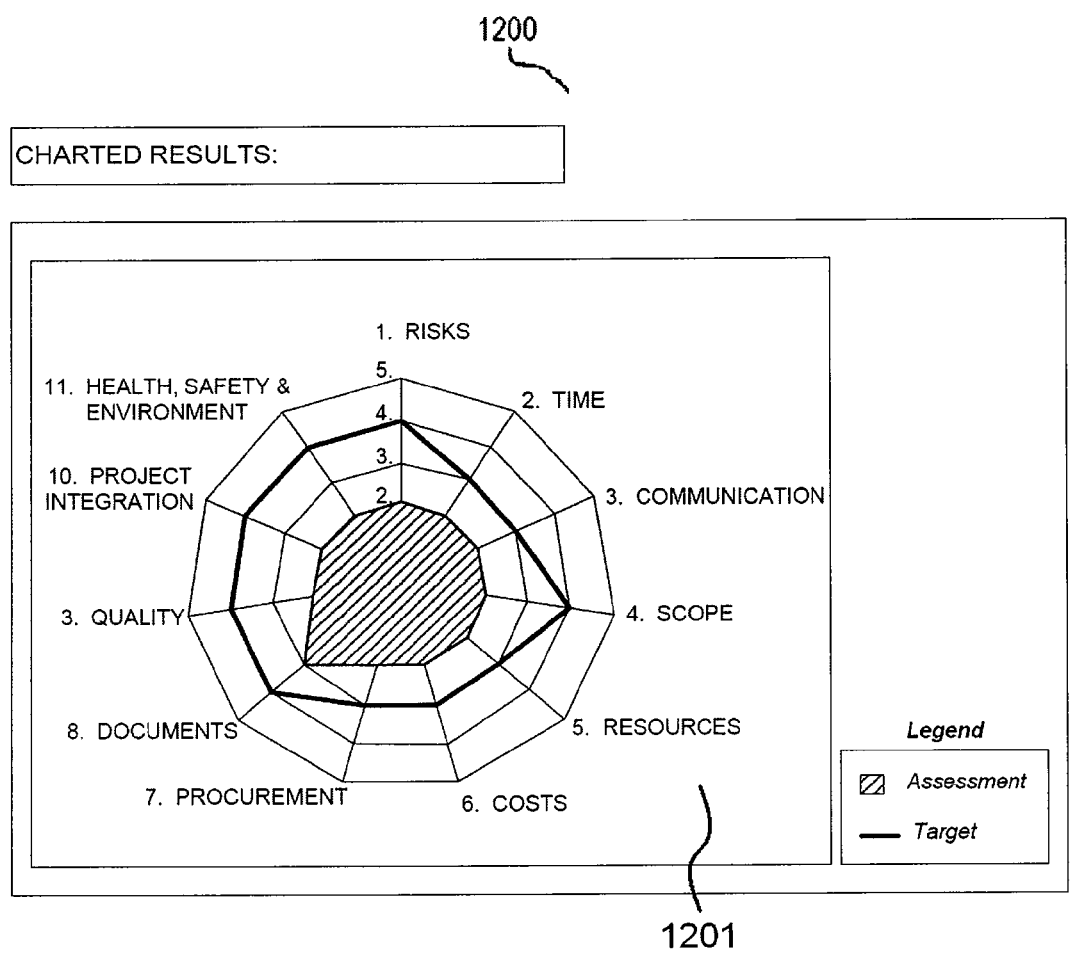
FIG. 12 is an exemplary depiction of a user interface to a tool for assessing PMOs, including a graphical representation of quantitative scores produced during a PMO assessment, consistent with principles of the present invention.

In some embodiments, the numerical scores 1101 are presented simply as numbers, as shown in FIG. 11. In other embodiments, the numerical scores 1101 are presented graphically. FIG. 12 is an exemplary depiction of a user interface 1200 displaying a graphical representation 1201 of quantitative scores produced during a PMO assessment, consistent with principles of the present invention. FIG. 12 shows how, in one embodiment, numerical scores 1101 may be graphically presented in relation to their associated target scores 1102. Examples of graphical presentations 1201 may include, but are not limited to, line graphs, bar graphs, pictographs, pie charts, cosmographs, Venn diagrams, radar graphs, and area graphs. In the embodiment shown, a single graphical presentation 1201 is used to present the scores of all of the project management areas that were assessed, although individual graphical representations 1201 may be used for each score as well.

In some embodiments, recommendations are provided to the PMO based on the assessment. The recommendations may be provided along with, or separate from, the scores described above. In one embodiment, recommendations may be stored data files that provide specific guidance, advice, proposals, targets, or suggestions to the PMO for improving the PMO's capabilities 200. The system may choose the appropriate file(s) to output based on the gap analysis evaluation. For example, if the assessment revealed that the PMO lacked adequate maturity in the area of cost management, the recommendations may include suggestions for improving cost management within the PMO. In certain embodiments, the recommendations relate to multiple capabilities 200 of the PMO. For instance, some recommendations may address procurement management jointly with health, safety, and environmental management. In one embodiment, the recommendations are based on assessments involving both industry best practices 701A and maturity information 701B. In one embodiment, the scores and the recommendations are provided to the PMO in a single report.

Figure 13:
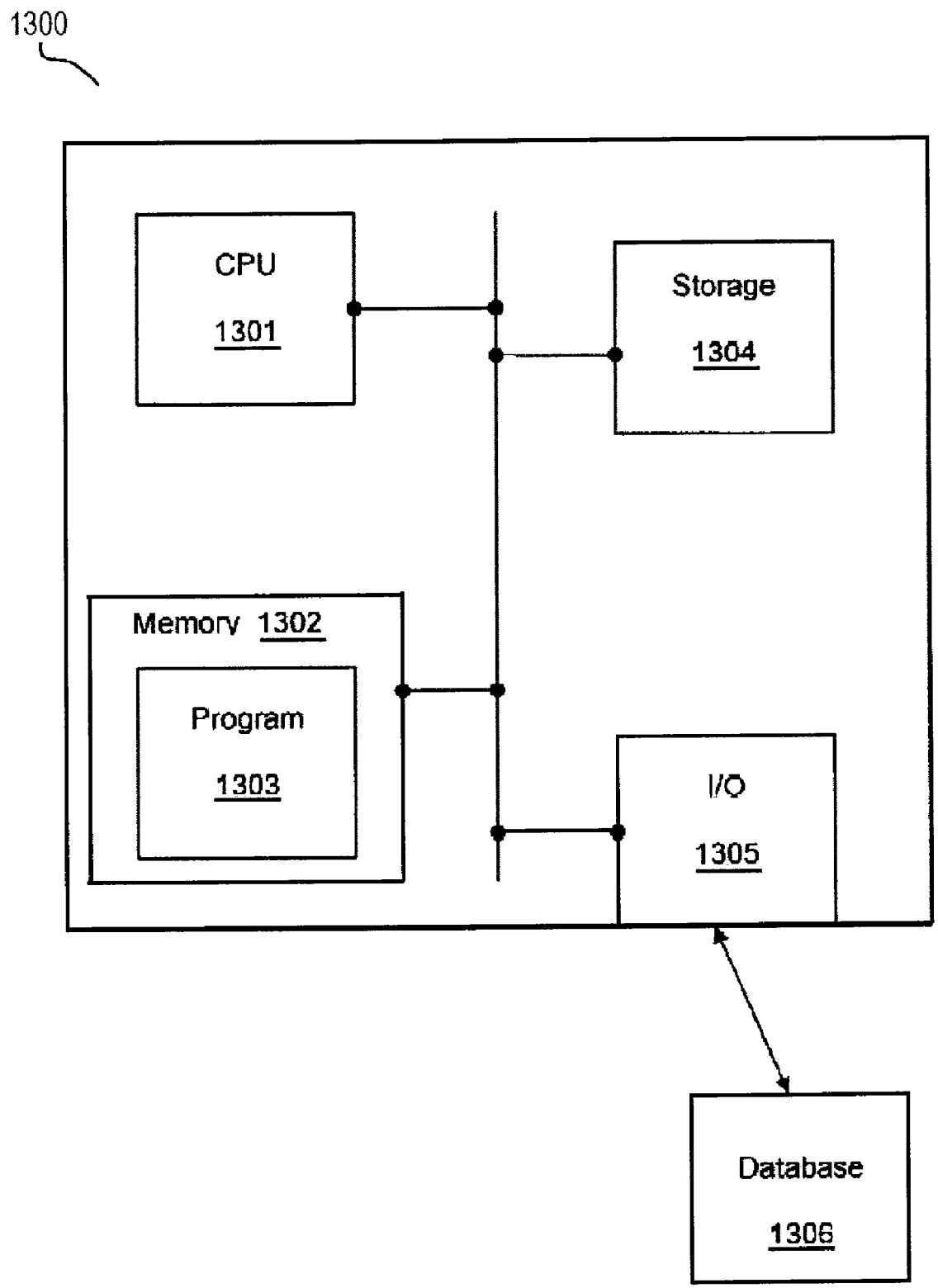
FIG. 13 is an illustration of an exemplary computing system that may be used to implement embodiments of the invention.

FIG. 13 is an illustration of an exemplary computing system 1300 that may be used to implement embodiments of the invention. The components and arrangement, however, may be varied within principles of the present invention.

Data processing or computing system 1300 includes a number of components, such as a central processing unit (CPU) 1301, a memory 1302, an input/output (I/O) device(s) 1305, a nonvolatile storage device 1304, and a database 1306. System 1300 can be implemented in various ways. For example, an integrated platform (such as a workstation, personal computer, laptop, etc.) may comprise CPU 1301, memory 1302, nonvolatile storage 1304, and I/O devices 1305. In such a configuration, components 1301, 1302, 1304, and 1305 may connect through a local bus interface and access database 1306 (shown implemented as a separate database system) via an external connection. This connection may be implemented through a direct communication link, a local area network (LAN), a wide area network (WAN) and/or other suitable connections. System 1300 may be standalone or it may be part of a subsystem, which may, in turn, be part of a larger system, such as document screening system.

CPU 1301 may be one or more known processing devices, such as a microprocessor from the Pentium™ family manufactured by Intel™ or the Turion™ family manufactured by AMD™. Memory 1302 may be one or more storage devices configured to store information used by CPU 1301 to perform certain functions related to embodiments of the present invention. Storage 1304 may be a volatile or non-volatile, magnetic, semiconductor, tape, optical, removable, nonremovable, or other type of storage device or computer-readable medium. In one embodiment consistent with the invention, memory 1302 includes one or more programs or subprograms 1303 loaded from storage 1304 or elsewhere that, when executed by CPU 1301, perform various procedures, operations, or processes consistent with the present invention. For example, memory 1302 may include one or more software programs 1303 implementing the processes and methods for PMO assessments and evaluations described above. The software programs may provide the aforementioned user interfaces and fields, and perform bookkeeping tasks, (such as storing inputted PMO, best practices, and maturity information, to support roll-back, storing the user's input, etc.), perform analysis and evaluation algorithms, manage the document screening process, and provide user guidance and help.

Memory 1302 may also include other programs that perform other functions and processes, such as programs that provide communication support, Internet access, etc. The software programs 1303 may be created using numerous programs and languages, including but not limited to Microsoft Excel, C, C++, C#, Lisp, HTML, XSLT, Java, JavaScript, Perl, PHP, Python, Ruby, and SQL, combinations thereof, and/or customized software developed by the user.

Methods, systems, and articles of manufacture consistent with the present invention are not limited to separate programs or computers configured to perform dedicated tasks. For example, memory 1302 may be configured with a program 1303 that performs several functions when executed by CPU 1301. For example, memory 1302 may include a single program 1303 that performs the functions of PMO assessment and evaluation, as well as other functions. Moreover, CPU 1301 may execute one or more programs located remotely from system 1300. For example, system 1300 may access one or more remote programs that, when executed, perform functions related to embodiments of the present invention.

Memory 1302 may be also configured with an operating system (not shown) that performs several functions well known in the art when executed by CPU 1301. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 1305 may comprise one or more input/output devices that allow data to be received and/or transmitted by system 1300. For example, I/O device 1305 may include one or more input devices, such as a keyboard, touch screen, mouse, and the like, that enable data to be input from a user, such as PMO capability information, best practices information, maturity information, etc. Further, I/O device 1305 may include one or more output devices, such as a display screen, CRT monitor, LCD monitor, plasma display, printer, speaker devices, and the like, that enable data to be output or presented to a user. I/O device 1305 may also include one or more digital and/or analog communication input/output devices that allow computing system 1300 to communicate with other machines and devices. System 1300 may input data from external machines and devices and output data to external machines and devices via I/O device 1305. The configuration and number of input and/or output devices incorporated in I/O device 1305 are not critical to the invention.

System 1300 may also be communicatively connected to a database 1306. Database 1306 may comprise one or more databases that store information and are accessed and/or managed through system 1300. By way of example, database 1306 may be an Oracle™ database, a Sybase™ database, or other relational database. Database 1306 may include, for example, data and information related to one or more PMO's current or historical capabilities 200, current and prior versions of best practices information 901A, and current and prior versions of maturity information 901B. Systems and methods of the present invention, however, are not limited to separate databases or even to the use of a database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented using a computer, of assessing a project management office, comprising:
    inputting, using a user interface running on the computer, information relating to maturities of project management capabilities of the project management office in a plurality of project management areas;
    retrieving, using the computer, industry best practices information relating to maturities of project management capabilities of other project management offices in the plurality of project management areas;
    retrieving, using the computer, maturity information relating to maturities of project management capabilities of other project management offices in the plurality of project management areas;
    accessing selectable pre-defined levels of maturity and selectable pre-defined sub-levels of maturity to represent the capabilities of the project management office;
    associating the selectable pre-defined levels of maturity and the selectable pre-defined sub-levels of maturity with weighted quantitative scores;
    comparing the capabilities of the project management office with the industry best practices and the maturity information in the plurality of project management areas;
    evaluating, using the weighted quantitative scores, the project management office based on the comparison to produce an evaluation, wherein the evaluation comprises actual scores and target scores for each of the plurality of project management areas; and
    displaying in the user interface a graphical representation of the evaluation, wherein the graphical representation comprises graphical representations of the actual scores and target scores for each of the plurality of project management areas.

2. The method of claim 1, wherein the actual scores and target scores are displayed together, both numerically and graphically, in one graphical representation.

3. A method, implemented using a computer, of assessing a project management office, comprising:
    receiving, using a user interface running on the computer, information relating to maturity of a project management capability of the project management office;
    retrieving from a database, using the computer, an industry best practice relating to maturity of the capability;
    retrieving from a database, using the computer, maturity information relating to maturity of the capability acquired from prior assessments of project management offices;
    accessing selectable pre-defined levels of maturity and selectable pre-defined sub-levels of maturity to represent the capability;
    associating the selectable pre-defined levels of maturity and the selectable pre-defined sub-levels of maturity with weighted quantitative scores;
    comparing, using the computer and the weighted quantitative scores, the maturity of the capability of the project management office with the industry best practice relating to maturity of the capability and the maturity information relating to maturity of the capability;
    generating, in the user interface, an actual score and a target score for the capability of the project management office;
    producing, in the user interface, a recommendation for improving the maturity of the capability of the project management office based on the quantitative score; and
    producing, in the user interface, a report including the recommendation and the actual score and target score for the capability of the project management office.

4. The method of claim 3, wherein comparing further comprises:
    selecting fields representing pre-defined levels of maturity for the project management capability of the project management office; and
    comparing the selected fields with pre-defined levels of maturity representing the industry best practice relating to the maturity of the capability and the maturity information relating to the maturity of the capability.

5. A method, implemented using a computer, of assessing a project management office, comprising:
    inputting, using a user interface running on the computer, information relating to capabilities of the project management office, wherein the project management office is an entity within an organization that has responsibilities related to the oversight of projects undertaken by the organization;
    retrieving, using the computer, industry best practices and maturity information relating to the capabilities;
    accessing selectable pre-defined levels of maturity and selectable pre-defined sub-levels of maturity to represent the capabilities of the project management office;
    representing the selectable pre-defined levels of maturity and the selectable pre-defined sub-levels of maturity with weighted quantitative scores;
    performing gap analysis on the capabilities of the project management office and the industry best practices and maturity information;
    evaluating, using the weighted quantitative scores, the project management office based on the gap analysis to produce an evaluation; and
    producing, in the user interface, recommendations for improving the capabilities of the project management office based on the evaluation.

6. The method of claim 5, further comprising:
    providing a quantitative score for the capabilities based on the evaluation.

7. The method of claim 5, further comprising:
    providing a plurality of quantitative scores, and a plurality of recommendations, for a plurality of the capabilities based on the evaluation.

8. The method of claim 7, wherein the quantitative scores are displayed together in one graphical representation.

9. The method of claim 7, wherein the quantitative scores are determined by selecting pre-defined levels of maturity corresponding to the capabilities of the project management office.

10. The method of claim 5, wherein the industry best practices and maturity information relate to capabilities of project management offices.

11. The method of claim 5, wherein the maturity information includes information from past assessments of project management offices.

12. The method of claim 5, wherein the gap analysis further comprises:
    selecting pre-defined levels of maturity to represent the capabilities of the project management office; and
    comparing the selected pre-defined levels with pre-defined levels of maturity representing the industry best practices and maturity information.

13. The method of claim 12, further comprising:
selecting pre-defined sub-levels of maturity for one or more pre-defined levels of maturity; and
comparing the selected pre-defined sub-levels with pre-defined sub-levels of maturity representing the industry best practices and maturity information.

14. The method of claim 5, wherein the weighted quantitative scores represent relative levels of significance of the capabilities of the project management office.

15. The method of claim 5, further comprising:
storing the information relating to capabilities of the project management office and the industry best practices and maturity information relating to the capabilities in a database, organized by project management capabilities.

16. The method of claim 5, further comprising:
providing pre-formatted fields for inputting information relating to capabilities of the project management office.

17. The method of claim 5, wherein the gap analysis and evaluation are performed by the project management office to analyze its own capabilities.

18. The method of claim 5, wherein the gap analysis and evaluation are performed by an outside analyst.

19. The method of claim 5, wherein the industry best practices and maturity information is regularly updated.

20. The method of claim 1, wherein the actual scores and target scores are presented together with recommendations for improving the capabilities of the project management office.

* * * * *